United States Patent
Boulanger et al.

(10) Patent No.: US 9,040,163 B2
(45) Date of Patent: May 26, 2015

(54) GLASS ARTICLE WITH ANTIMICROBIAL PROPERTIES

(75) Inventors: Pierre Boulanger, Couthuin (BE); Fabian Mariage, Beclers (BE)

(73) Assignee: AGC Glass Europe, Brussels (BE)

( * ) Notice: Subject to any disclaimer, the term of this patent is extended or adjusted under 35 U.S.C. 154(b) by 0 days.

(21) Appl. No.: 13/810,971

(22) PCT Filed: Jul. 27, 2011

(86) PCT No.: PCT/EP2011/062868
§ 371 (c)(1),
(2), (4) Date: Jan. 18, 2013

(87) PCT Pub. No.: WO2012/013695
PCT Pub. Date: Feb. 2, 2012

(65) Prior Publication Data
US 2013/0123091 A1    May 16, 2013

(30) Foreign Application Priority Data

Jul. 27, 2010 (EP) .................................. 10170847

(51) Int. Cl.
*C03C 1/00* (2006.01)
*C03C 14/00* (2006.01)
*B32B 15/00* (2006.01)
*B32B 17/06* (2006.01)
*C03C 4/00* (2006.01)

(52) U.S. Cl.
CPC ................. *C03C 14/004* (2013.01); *C03C 4/00* (2013.01); *C03C 2204/02* (2013.01); *C03C 2214/04* (2013.01); *C03C 2214/08* (2013.01)

(58) Field of Classification Search
CPC .... C03C 14/004; C03C 4/00; C03C 2204/02; C03C 2214/04; C03C 2214/08
USPC .......... 501/10, 32, 70, 72; 428/426, 432, 433; 65/33.1, 33.4
See application file for complete search history.

(56) References Cited

U.S. PATENT DOCUMENTS

| 5,968,637 A | 10/1999 | Baret |
| 2003/0097858 A1 | 5/2003 | Strohhofer et al. |
| 2005/0119105 A1* | 6/2005 | Zimmer et al. ................. 501/32 |

(Continued)

FOREIGN PATENT DOCUMENTS

| EP | 0 806 401 | 11/1997 |
| EP | 1 985 592 | 10/2008 |
| WO | 2006 064059 | 6/2006 |

OTHER PUBLICATIONS

International Search Report Issued Oct. 31, 2011 in PCT/EP11/62868 Filed Jul. 27, 2011.

(Continued)

*Primary Examiner* — Noah Wiese
(74) *Attorney, Agent, or Firm* — Oblon, McClelland, Maier & Neustadt, L.L.P.

(57) ABSTRACT

The invention relates to a glass item, at least one of the surfaces thereof having antimicrobial properties that are resistant to a temperature treatment, especially a temperature treatment in preparation of the subsequent tempering thereof. The glass item especially comprises an antimicrobial agent beneath the surface of the glass, and nanoparticles that are partially and/or totally incorporated into the mass of the glass close to said surface and consist of at least one inorganic component.

18 Claims, 4 Drawing Sheets

(56) References Cited

U.S. PATENT DOCUMENTS

2009/0324990 A1  12/2009  Pilloy et al.
2010/0137121 A1  6/2010  Mariage et al.
2011/0081542 A1  4/2011  Pilloy et al.
2011/0183831 A1  7/2011  Mariage et al.

OTHER PUBLICATIONS

U.S. Appl. No. 13/810,305, filed Jan. 15, 2013, Boulanger, et al.

* cited by examiner

GLASS ARTICLE WITH ANTIMICROBIAL PROPERTIES

1. FIELD OF THE INVENTION

The present invention relates to a glass article, one of the surfaces of which has antimicrobial properties that are resistant to a temperature treatment, in particular a temperature treatment in preparation for their subsequent toughening.

2. SOLUTIONS OF THE PRIOR ART

There are different types of glass substrates that have a surface with antimicrobial properties and they all have at least one so-called "antimicrobial" agent. This is often located at the surface of said article. Examples of known antimicrobial agent are silver (Ag), copper (Cu) or zinc (Zn).

A glass substrate with antimicrobial properties known in particular from application WO 2005/042437 A1 is obtained by diffusing the antimicrobial agent, in particular silver (Ag), from one of the surfaces of the substrate to the bulk of the substrate over a depth in the order of 2 microns. The antimicrobial agent is then present below the surface of the glass.

Another known type of glass substrate with antimicrobial properties comprises a coating on one of its surfaces that is formed by a binder and the antimicrobial agent dispersed in this binder. Such examples of substrates are given in the applications WO 03/056924 A1 and WO 2006/064060 A1.

Unfortunately, whatever the type of substrate envisaged, the antimicrobial properties are only very poorly resistant to a treatment at temperatures higher than 400° C. In fact, as a result of the rapid diffusion of the element Ag at these temperatures, this migrates progressively from the surface or from a zone close to the surface, where it is effective to neutralise microbes, towards the bulk of the glass substrate where it is no longer available to play its antimicrobial role. Such temperatures, which are typically those required to conduct the toughening of the glass (~650-700° C.), thus cause a drastic decrease in antimicrobial properties of the glass that would be thermally treated.

Now, more and more glazing applications require toughened glass sheets for safety reasons, since such a glass has increased shock resistance.

One solution to the problem arising from a thermal treatment of a glass substrate with antimicrobial properties is already known. It concerns using a so-called "diffusion barrier" layer in order to reduce or slow down the diffusion of the silver in the bulk of the glass and thus preserve the initial antimicrobial activity to the maximum. The prior art describes the use of such a layer that is then deposited directly onto the surface of the glass, and it is imperative that this is between the glass and the antimicrobial agent. The substrate must then have a second layer containing the antimicrobial agent, either alone or in combination with a binder, deposited onto the barrier layer. Such a solution to the problem is described in particular in the international application WO 2006/064060 A1.

However, this technical solution has certain limitations. In fact, the addition of one or more layers to a glass substrate often causes deterioration of the optical and/or aesthetic properties of the substrate such as, for example, a decrease in the light transmission, a change in colour or an increase in light reflection.

Moreover, this technical solution requires the consecutive deposition of at least two layers on the glass substrate, which necessarily results in additional steps in the production process, higher cost, etc.

Another technical solution to the problem of diffusion of the silver from the surface towards the bulk would be to use a larger concentration of silver from the beginning so that the adverse effect of this diffusion on the antimicrobial activity remains insignificant or low. Nevertheless, at first glance this solution is not very convincing for obvious economic reasons, but also for aesthetic reasons, since too high a concentration of silver is known to cause an unsightly yellow coloration of the glass.

3. OBJECTIVES OF THE INVENTION

The objective of the invention in particular is to overcome these disadvantages by resolving the technical problem, i.e. the reduction or slowing down of the diffusion of silver in the glass because of a thermal treatment of a glass substrate antimicrobial properties.

More precisely, an objective of the invention in at least one of its embodiments is to provide a glass substrate with antimicrobial properties, wherein the antimicrobial properties remain stable at temperatures higher than 400° C. In particular, an objective of the invention is to provide a glass substrate with antimicrobial properties, wherein the antimicrobial properties remain stable in a temperature treatment in preparation for their subsequent toughening.

Another objective of the invention is to provide a glass substrate with antimicrobial properties that does not comprise a layer and/or does not require a step of depositing layers.

Finally, a last objective of the invention is to provide a solution to the disadvantages of the prior art that is simple, quick and economical.

4. OUTLINE OF THE INVENTION

In accordance with a particular embodiment the invention relates to a glass article comprising
(i) at least one antimicrobial agent diffused under at least one surface of the glass; and
(ii) nanoparticles at least partially incorporated into the bulk of the glass close to said surface and formed from at least one inorganic compound.

Hence, the invention is based on a completely novel and inventive approach, since it allows the disadvantages of the glass products of the prior art to be overcome and the set technical problem to be resolved. The inventors have in fact shown that it was possible to obtain a glass substrate that has antimicrobial properties that are temperature-resistant without resorting to layers, by combining an antimicrobial agent diffused in a known manner under the surface of the glass with nanoparticles that are formed from at least one inorganic compound and are completely and/or partially incorporated into the bulk of said glass close to its surface. Surprisingly, the inventors have thus shown that the presence of nanoparticles included in the surface or below the surface of the glass article enabled the diffusion of the silver under the effect of the temperature to be blocked or slowed down.

5. LIST OF FIGURES

Other characteristics and advantages of the invention will become clearer upon reading the following description of a preferred embodiment given as non-restrictive and illustrative simple example and the attached figures, wherein.

6. DESCRIPTION OF AN EMBODIMENT OF THE INVENTION

The glass article according to the invention is formed from an inorganic glass that can belong to various categories. Thus, the inorganic glass can be a soda-lime type of glass, a boron glass, a lead glass, a glass containing one or more additives distributed homogeneously in its bulk such as, for example, at least one inorganic colouring agent, an oxidising compound, a viscosity-regulating agent and/or a fusion-promoting agent. The glass article according to the invention is preferably a soda-lime glass, which can be clear or solidly coloured. The expression "soda-lime glass" is used in its broad sense here and relates to any glass that contains the following base components (expressed in percentages of the total weight of glass):

| | |
|---|---|
| $SiO_2$ | 60 to 75% |
| $Na_2O$ | 10 to 20% |
| CaO | 0 to 16% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20% |

It also relates to any glass containing the above base components that can additionally contain one or more additives.

According to an embodiment of the article according to the invention the glass of the article according to the invention is formed from a sheet of flat glass. According to this embodiment the flat glass can be, for example, a float glass, a drawn glass or a patterned glass.

Still according to this embodiment, the flat glass sheet can be subjected to the treatment according to the invention on a single face or alternatively on both its faces. In the case of a treatment on a single face of a patterned glass sheet, the treatment according to the invention is advantageously conducted on the face of the sheet that is not patterned, if this is patterned on a single face.

The glass of the article according to the invention is preferably formed from a soda-lime flat glass sheet.

It is generally preferred that the glass article has not been subjected to a coating with any layer before the treatment of the present invention, at least on the surface to be treated. The glass article according to the invention can be subjected to a coating with any layer after the treatment of the present invention, preferably on the surface opposite that which has been treated according to the invention.

The glass article according to the invention has antimicrobial properties. This is understood to mean a glass article that enables microorganisms that come into contact with it to be neutralised. "Microorganisms" are understood to be microscopic unicellular living beings such as bacteria, yeasts, micro-algae, fungi or viruses. "Neutralise" is understood to mean at minimum maintaining the initial quantity of the microorganisms (static effect), and the invention excludes an increase in this quantity. The development and proliferation of microorganisms are thus prevented and in almost all cases the coating surface of the microorganisms decreases even if the quantity thereof is maintained. According to the invention the neutralisation of microorganisms can extend to their partial and even total destruction (microbicidal effect).

In particular, the glass article according to the invention has an antibacterial (bactericidal or bacteriostatic) effect on a large number of bacteria, whether these are gram positive or gram negative bacteria, in particular on one at least of the following bacteria: *Escherichia coli*, *Staphylococcus aureus*, *Pseudomonas aeruginosa*, *Enterococcus hirae*. Advantageously, the glass article according to the invention also has an antifungal (fungicidal or fungiostatic) effect, in particular on *Candida albicans* and/or *Aspergillus niger*.

The glass article according to the invention comprises at least one antimicrobial agent diffused under at least one surface of the glass in the bulk of the glass close to said surface. According to the invention the antimicrobial agent is chosen from the elements: silver (Ag), copper (Cu), tin (Sn) and zinc (Zn).

According to the invention the antimicrobial agent is present either in the form of very small particles of metal or oxide or dissolved in the matrix of the glass.

The antimicrobial agent according to the invention is preferably the element silver (Ag). In this case, the silver is advantageously diffused under the surface so that the ratio of intensities I(CsAg)/I(CsSi) measured on the surface using the dynamic SIMS method is higher than 0.002 and preferably higher than or equal to 0.010. Such values for the ratio of intensities I(CsAg)/I(CsSi) enable an adequate antimicrobial effect to be obtained.

The measurement of the ratio of intensities I(CsAg)/I(CsSi) was conducted on a Cameca ims-4f machine. I(CsAg) is the peak intensity obtained for the ions CsAg+ and I(CsSi) is the peak intensity obtained for the ions CsSi+ after the surface of the substrate has been bombarded by a beam of Cs+ ions, which progressively etch the surface of the sample. The energy of the beam of Cs+ ions reaching the substrate is 5.5 keV. The angle of incidence of the beam is 42° in relation to the normal to the substrate. The surface values signify that the values are taken for the lowest possible depth as soon as the obtained value is significant. Depending on the rate of erosion used, the first significant values can correspond to maximum depths of about 1 to 5 nm. In the present case the surface values correspond to a depth of 2 nm at maximum. To ensure that the values obtained are significant, the ratio of intensities of the isotopes I(Ag107)/I(Ag109) must especially be close to the theoretical value (1.0722), in particular in the range between 1.01 and 1.13.

According to a particular embodiment of the invention the concentration of antimicrobial agent is distributed in the depth of the glass according to a classic diffusion profile, i.e. a profile that decreases continuously from the surface of the glass and tends towards zero at a given depth.

According to another particular embodiment of the invention the concentration of antimicrobial agent is distributed in the depth of the glass according to a profile that has a minimum. The minimum is preferably located at a distance from the surface of between 10 and 4000 nm.

According to the invention the nanoparticles are
(i) partially incorporated into the bulk of the glass; and/or
(ii) completely incorporated into the bulk of the glass.

Nanoparticle partially incorporated into the bulk of the glass is understood to mean a nanoparticle that is located both in the bulk of the glass and outside the bulk of the glass. In other words, the nanoparticle is not completely surrounded by the glass.

Nanoparticle completely incorporated into the bulk of the glass is understood to mean a nanoparticle that is located under the surface of the glass of the article at a close distance therefrom.

The nanoparticles of the invention are formed from at least one inorganic compound. In the alternative case where they comprise several inorganic compounds within them, the composition can be homogeneous or heterogeneous.

According to the invention the inorganic compound can be completely foreign to the composition of the bulk of the glass of the article. In a variant, it can also be already present in the composition of the bulk of the glass of the article.

Any inorganic compound that reduces or slows down the diffusion of the antimicrobial agent under the effect of temperature can be suitable. However, it is generally preferred that the inorganic compound forming the nanoparticles in the glass article is chosen from oxides, nitrides, carbides and mixtures thereof.

It is more preferred that the inorganic compound is selected from compounds of magnesium, calcium, strontium, barium, scandium, yttrium, lanthanum, titanium, zirconium, vanadium, niobium, tantalum, aluminium, gallium, indium, silicon, germanium, and combinations of at least two of the above compounds. Advantageously, the inventors have shown that the resistance to temperature of the antimicrobial properties is particularly good when the inorganic compound is an aluminium compound and in particular an aluminium oxide.

According to a preferred embodiment of the invention the nanoparticles are at least partially crystallised, i.e. at least a proportion of 5% of their weight is formed from crystals. The crystals can belong to several different crystallisation systems. In a variant, they can also all be from the same crystallisation system. At least 50% of the weight of the nanoparticles is preferably in a crystallised form. It is most particularly preferred if all the nanoparticles are in crystallised form.

According to another embodiment the shape of the nanoparticles is quasi-spherical. Quasi-spherical is understood to mean a three-dimensional shape with a volume close to that of a sphere, the diameter of which would be equal to the largest dimension of an object with this quasi-spherical shape.

The nanoparticles of the invention have a dimension that is not smaller than 2 nm and preferably that is not smaller than 10 nm. Moreover, the nanoparticles have a dimension that is not larger than 1000 nm and preferably that is not larger than 500 nm, and more preferred that is not larger than 300 nm. Dimension is understood to denote the largest dimension of the nanoparticles.

The glass article according to the invention can be thermally treated, in particular it can be thermally treated in preparation for a toughening operation. The invention covers the glass article that has not been thermally treated as well as the thermally treated glass article. According to a particular embodiment of the invention, the glass article has antimicrobial properties as well as properties of toughened glass. Glass with properties of toughened glass is understood to be a glass that has increased mechanical strength in relation to a classic non-toughened glass of the same thickness and the same composition.

The glass article according to the invention can be obtained using a process comprising two main steps:
(a) the partial and/or complete inclusion of nanoparticles in the bulk of the glass close to said surface; and
(b) the deposition and diffusion of the antimicrobial agent under the surface of the glass.

Different methods known per se are suitable for partially and/or completely including nanoparticles into the bulk of the glass. In particular, an example of a process comprises (a) the production of nanoparticles, (b) the deposition of the nanoparticles onto the surface of the article, and (c) the supply of energy to the nanoparticles and/or to said surface in such a manner that the nanoparticles diffuse/are incorporated into the glass. The formation and deposition of nanoparticles on the surface of the glass can be conducted in a single step by known methods such as chemical vapour deposition (or CVD), wet deposition such as sol-gel deposition, for example, or flame spraying starting with a liquid, gaseous or solid precursor.

In flame spraying, which is cited as an example and is disclosed in particular in patent application FI954370, the nanoparticles are generated by atomising a solution of at least one chemical precursor in an aerosol transported into a flame where combustion occurs to form solid nanoparticles. These nanoparticles can then be deposited directly onto the surface located close to the edge of the flame.

In a variant, the formation and deposition of nanoparticles on the surface of the glass article can be performed consecutively in two steps. In this case, the nanoparticles are generated firstly in solid form or in the form of a suspension in a liquid using the vapour method, the wet method (sol-gel, precipitation, hydrothermal synthesis . . . ) or using the dry method (mechanical grinding, mechanical-chemical synthesis . . . ). An example of a method that enables nanoparticles to firstly be generated in solid form is the method known as combustion chemical vapour condensation (or CCVC). This method consists of converting a precursor solution in vapour phase in a flame that undergoes a combustion reaction to form particles that are then collected.

The first generated nanoparticles can then be transferred to the surface of the glass by different known methods.

The energy necessary for the diffusion/incorporation of the nanoparticles into the bulk of the glass can be supplied, for example, by heating the glass or its surface to an appropriate temperature. The energy necessary for the diffusion/incorporation of the nanoparticles into the bulk of the glass can be supplied at the time of deposition of the nanoparticles or subsequently. Flame spraying is particularly advantageous in this case since the energy necessary for the diffusion/incorporation of the nanoparticles into the bulk of the glass is supplied at the time of deposition of the nanoparticles by the heat of the flame itself.

The international applications WO 2008/132173 A1 and WO 2010/046336 A1 describe the incorporation of aluminium oxide into glass using a process in a single step by means of flame spraying starting with an aluminium salt. Advantageously, the nanoparticles of the glass article according to the invention are obtained using such a process.

Different methods known per se are suitable for obtaining an antimicrobial agent below the surface of a glass article. In particular, it is possible to deposit the antimicrobial agent in the form of a layer by pyrolytic spray or by cathodic sputtering followed by a slight controlled diffusion of the antimicrobial agent under the surface, for example, for 30 minutes at a temperature of 250° C. The steps of depositing the antimicrobial agent and diffusing this under the surface can also be virtually simultaneous if the glass article or its surface is firstly heated.

Advantageously, the glass article according to the invention can be obtained in a single main step using a flame spraying technique starting from a solution of a salt of the inorganic compound or of a salt of the antimicrobial agent.

Because of its antimicrobial properties and because it can be thermally toughened without changing said properties, the glass article according to the invention has numerous applications. As an example, it can be used as recipient for foodstuffs or as an element for a bathroom, kitchen or laboratory (mirror, partition, floor, work surface, door). It can also be used as an element in appliances such as refrigerator shelves or oven doors. It also has numerous applications in hospitals.

The following examples illustrate the invention without intending to limit its coverage in any way.

Example 1

Comparative

Three sheets of clear soda-lime float glass with a thickness of 4 mm and measuring 20 cm×20 cm were washed consecutively in flowing water, deionised water and isopropyl alcohol and then dried. They were then each coated with a thin layer of silver using the method of vacuum deposition also referred to as cathodic magnetron sputtering in a manner known per se using a metallic silver target in an argon atmosphere. The quantity of silver deposited is 40 mg/m$^2$ of surface area treated. To cause the silver to diffuse under the surface, the three glass sheets were then subjected to a thermal treatment in the following conditions (duration and temperature):

sheet 1: 250° C. for 30 minutes;
sheet 2: 400° C. for 30 minutes;
sheet 3: 650° C. for 30 minutes.

The treated sheets were then cleaned in acid (solution of $HNO_3$ and $Fe(NO_3)_3$) to eliminate the excess silver remaining on the surface that has therefore not diffused during the thermal treatment.

The glass sheets treated as described above were analysed by secondary ion mass spectrometry.

Figure 1:
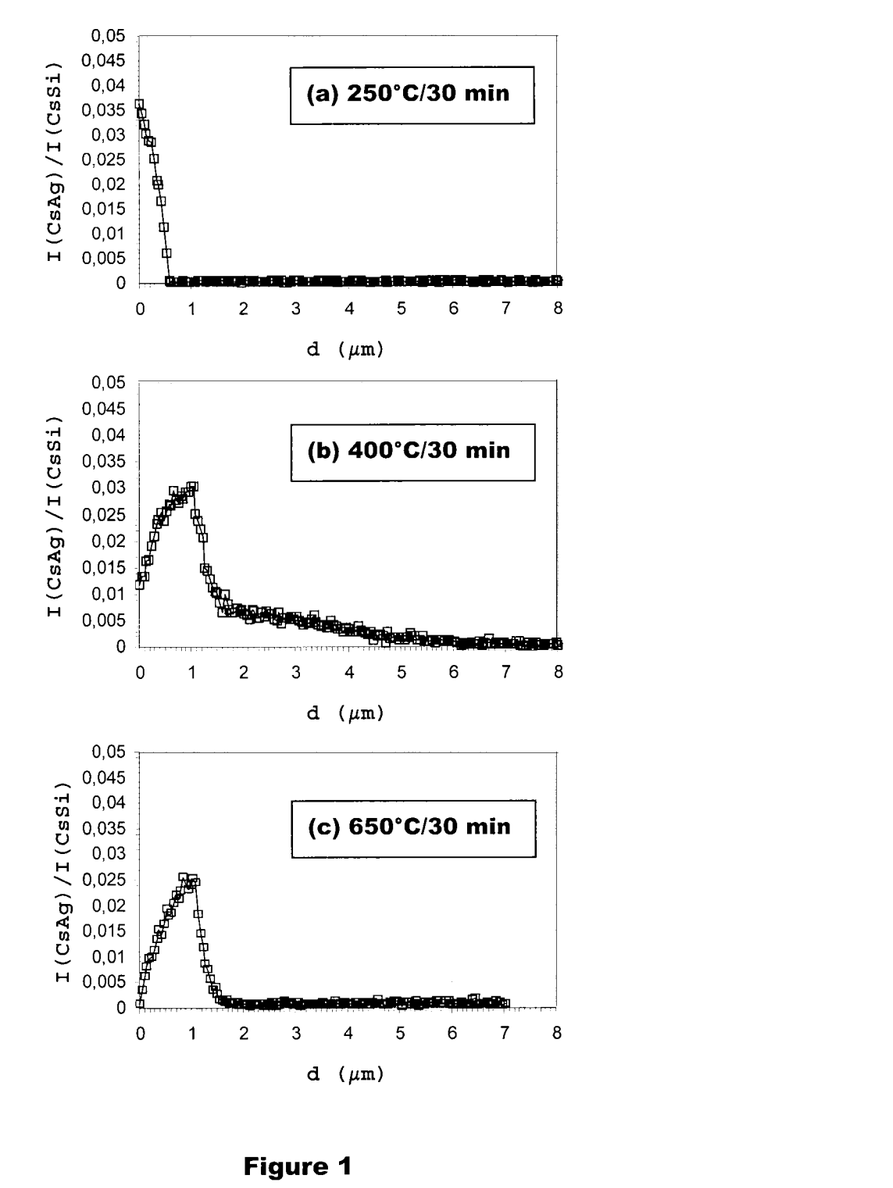
FIG. 1 shows, for comparison purposes, a profile of the silver concentration in the depth of the glass of glass articles with antimicrobial properties according to the state of the art.

FIG. 1 shows the quantity of silver (ratio of intensities I(CsAg)/I(CsSi)) diffused under the surface of the glass as a function of the depth (d) in the substrate for each of the thermal treatments (a), (b) and (c). Moreover, the quantity of silver at the surface (d=o) was estimated on the basis of the ratio I(CsAg)/I(CsSi) obtained by dynamic SIMS. I(CsAg) is the peak intensity obtained for the ions $CsAg^+$ and I(CsSi) is the peak intensity obtained for the ions $CsSi^+$ after the surface of the substrate has been bombarded by a beam of $Cs^+$ ions with a "Cameca ims-4f" machine (beam 5.5 keV and angle of incidence 42° in relation to the normal to the substrate). These analyses illustrate the drastic effect of the temperature on the quantity of silver present on the surface of the glass with the same duration of treatment. The determined intensity ratios I(CsAg)/I(CsSi) at the surface (d=o) are in fact as follows:

sheet 1: 0.037
sheet 2: 0.011
sheet 3: 0

A treatment at a temperature of 400° C. or 650° C. causes a very significant migration of the silver from the surface towards the bulk of the glass with a maximum centred around 1 micron. The silver located at this distance from the surface is no longer available to play its antimicrobial role and is therefore lost. The effect of the treatment at 650° C. is so negative that the quantity of silver present at the surface of the glass is practically zero.

Example 2

Comparative

A sheet of clear soda-lime float glass with a thickness of 4 mm and measuring 20 cm×20 cm was washed consecutively in flowing water, deionised water and isopropyl alcohol and then dried.

Hydrogen and oxygen were fed into a spot burner in order to generate a flame at the outlet of said burner. A solution containing silver nitrate $AgNO_3$ dissolved in water (aluminium/water dilution ratio by weight=1/2419, solution flux=10 ml/min) was fed into the flame. The washed glass sheet was firstly heated in a furnace to a temperature of 600° C. and one of its surfaces was placed under the burner close to the end of the flame at a distance of 130 mm. In order to cover the entire surface of the glass sheet, the spot burner is movable in both spatial directions within the plane of said sheet. The head of the burner was displaced continuously in one of the two directions at a fixed speed of 3 meters per minute and in the other direction perpendicular to the first was displaced with jumps of 2 centimeters. After this treatment the glass sheet was then cooled in a controlled manner.

The glass sheet treated as described above was analysed by secondary ion mass spectrometry.

Figure 2:
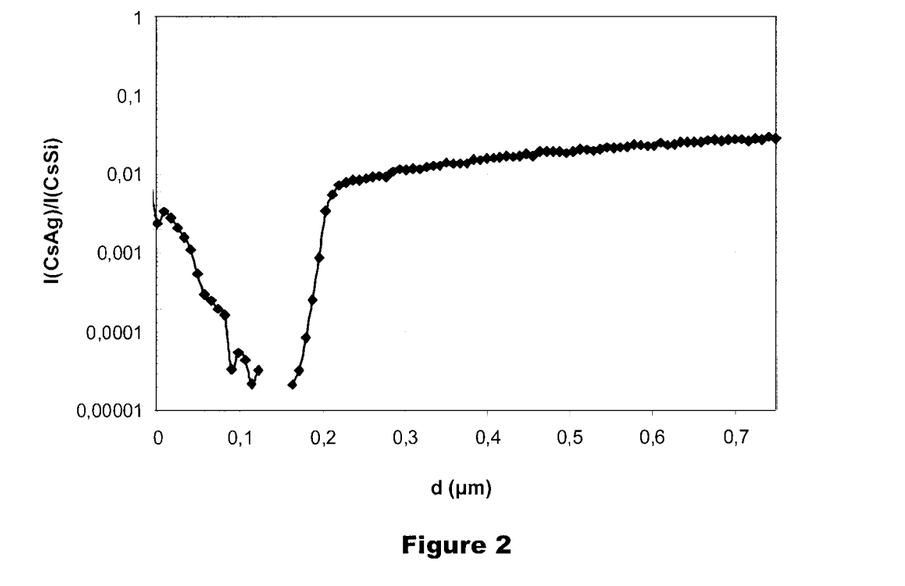
FIG. 2 shows, for comparison purposes, a profile of the silver concentration in the depth of the glass of an article without nanoparticles.

FIG. 2 shows the quantity of silver (ratio of intensities I(CsAg)/I(CsSi) on a logarithmic scale) diffused as a function of the depth (d) in the glass sheet starting from the treated surface. It illustrates the diffusion of the silver under the surface of the glass. The concentration of silver is distributed over a depth greater than 1 micron according to a profile that has a minimum at a depth from the surface of about 150 nm. Moreover, the ratio of intensities I(CsAg)/I(CsSi) at the surface is 0.002.

Example 3

According to the Invention

A sheet of clear soda-lime float glass with a thickness of 4 mm and measuring 20 cm×20 cm was washed consecutively in flowing water, deionised water and isopropyl alcohol and then dried.

Hydrogen and oxygen were fed into a linear burner in order to generate a flame at the outlet of said burner. The burner used had a width of 20 cm and had 2 nozzles for supply of the precursor solution. The washed glass sheet was firstly heated in a furnace to a temperature of 600° C. and at this temperature was then passed under the burner located at a distance of 90 mm above the glass sheet at a speed of about 8 m/min. The solution fed into the flame by means of the nozzles contained silver nitrate $AgNO_3$ dissolved in water (silver/water dilution ratio by weight=1/3500) and non-ahydrate aluminium nitrate $Al(NO_3)_3.9H_2O$ dissolved in methanol (aluminium/methanol dilution ratio by weight=1/20). The total flux of the solution was 360 ml/min. After this treatment the glass sheet was then cooled in a controlled manner.

The glass sheet treated as described above was analysed using scanning and transmission electron microscopy, X-ray fluorescence spectrometry, X-ray photoelectron spectroscopy and by secondary ion mass spectrometry.

The conducted analyses showed that the aluminium was incorporated into the bulk of the glass close to the surface in the form of aluminium oxide $Al_2O_3$ nanoparticles. The nanoparticles are primarily crystalline and they vary in size from 10 to too nm.

Figure 3:
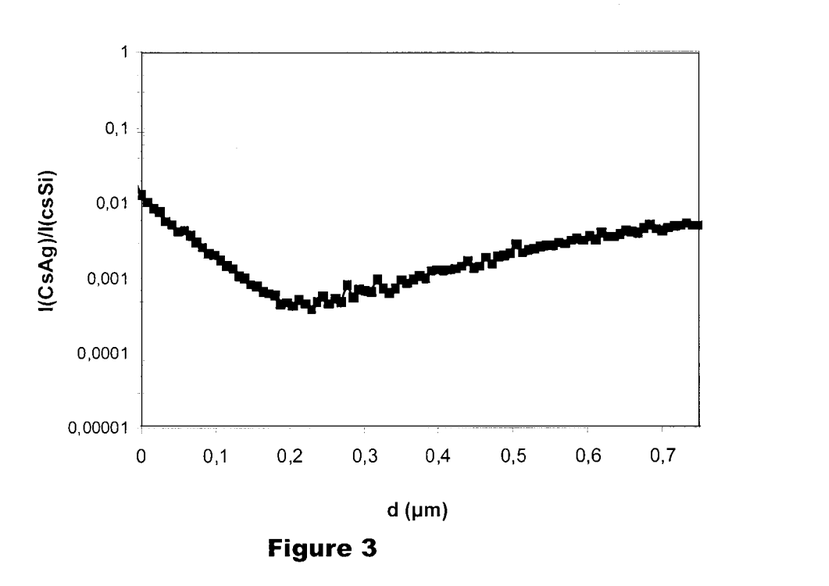
FIG. 3 shows a profile of the silver concentration in the depth of the glass of an article according to the invention obtained by flame spraying.

FIG. 3 shows the ratio of intensities I(CsAg)/I(CsSi) (logarithmic scale) as a function of the depth (d) in the glass sheet starting from the treated surface. It illustrates the diffusion of the silver under the surface of the glass. The concentration of silver is distributed in the depth of the glass according to a profile that has a maximum value at the surface, shows a progressive decrease to a minimum centred around 200 nm, followed by a slight increase ending by levelling out from about 0.8 micron. Moreover, the ratio I(CsAg)/I(CsSi) at the surface (maximum value of the profile) is 0.015, which shows that, starting from the same process for causing the silver to diffuse, the presence of nanoparticles enables a much higher silver concentration to be obtained at the surface of the glass, which benefits the antimicrobial activity.

Example 4

According to the Invention

An article according to the invention was obtained in an installation intended for the continuous production of soda-lime flat glass. This installation comprises a melting furnace, a tin bath and a cooling station. The glass in molten state was poured in ribbon form from the melting furnace onto the tin bath. The glass ribbon had an average thickness of 8 mm. It was then passed to a 20 cm wide linear burner at a constant speed of about 7.75 m/min at a temperature of 615° C. The burner was supplied with hydrogen and oxygen in order to generate a flame at the outlet of said burner and it was placed above the glass sheet at a distance of 145 mm. A solution containing silver nitrate $AgNO_3$ dissolved in methanol (silver/methanol dilution ratio by weight=1/3500) and non-ahydrate aluminium nitrate $Al(NO_3)_3.9H_2O$ dissolved in methanol (aluminium/methanol dilution ratio by weight=1/20) was fed into the flame (total solution flux=343 ml/min). The glass sheet was subsequently passed to the cooling station where it was cooled in a controlled manner in conditions usually used for flat float glass.

The glass sheet treated as described above was analysed using the same techniques as those cited in Example 3.

Figure 4:
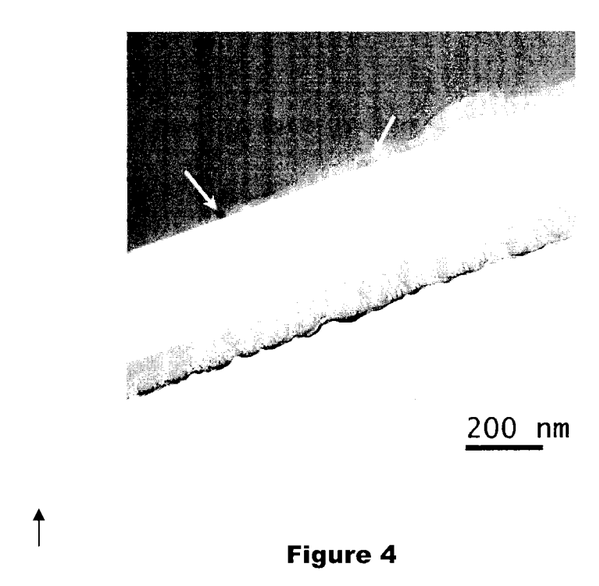
FIG. 4 shows an image obtained by transmission electron microscopy of a section of a glass article according to the invention.

The conducted analyses showed that aluminium was incorporated into the bulk of the glass close to the surface in the form of aluminium oxide $Al_2O_3$ nanoparticles. The nanoparticles are primarily crystalline and they vary in size from 5 to 50 nm. FIG. 4 shows an image obtained by transmission electron microscopy of a section of the treated glass sheet. It shows several aluminium oxide nanoparticles partially (1) or completely (2) incorporated into the bulk of the glass.

Figure 5:
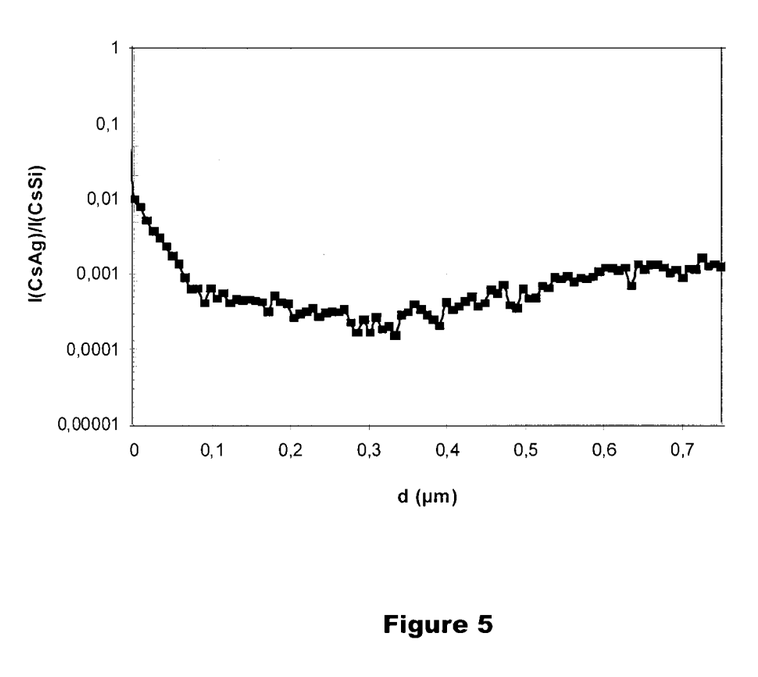
FIG. 5 shows a profile of the silver concentration in the depth of the glass of an article according to the invention obtained by flame spraying.

FIG. 5 shows the ratio of intensities I(CsAg)/I(CsSi) (logarithmic scale) as a function of the depth (d) in the glass sheet starting from the treated surface. It illustrates the diffusion of the silver under the surface of the glass. The concentration of silver is distributed in the depth of the glass according to a profile that has a maximum value at the surface, shows a progressive decrease to a level between 150 and 400 nm, followed by a slight increase ending by another levelling out from about 0.6 micron. The ratio I(CsAg)/I(CsSi) at the surface (maximum value of the profile) for Example 4 is 0.010, which once again shows that the presence of nanoparticles enables a much higher silver concentration to be obtained at the surface of the glass.

Example 5

According to the Invention

An article according to the invention was obtained in an installation intended for the continuous production of soda-lime flat patterned glass. This installation comprises a melting furnace, a rolling machine and a cooling station. The glass in molten state was poured in ribbon form from the melting furnace into the rolling machine where it was passed between two superposed rollers, one of which is smooth and the other engraved with a printed pattern. This printed pattern was then reproduced on a single face of the glass: the one facing downwards of the horizontal ribbon. Once it had passed through the rolling machine, the glass ribbon had an average thickness of 4 mm (3.5-4.5 mm). It was then passed towards a 2 m wide linear burner at a constant speed of about 3.7 m/min at a temperature of 710° C. The burner was supplied with hydrogen and oxygen in order to generate a flame at the outlet of said burner and it was placed above the glass sheet on the non-patterned side at a distance of 120 mm. A solution containing non-ahydrate aluminium nitrate $Al(NO_3)_3.9H_2O$ dissolved in methanol (aluminium/methanol dilution ratio by weight=1/60, flux=1000 ml/min) was fed into the flame. The glass sheet was subsequently passed to the cooling station where it was cooled in a controlled manner in the conditions usually used for flat patterned glass.

The glass sheet was then coated with a thin layer of silver by a vacuum deposition method also referred to as cathodic sputtering in a manner known per se using a metallic silver target in an argon atmosphere. The quantity of silver deposited is 100 mg/m² of surface area treated. To cause the silver to diffuse under the surface, the glass sheet was then subjected to a thermal treatment at 300° C. for 15 minutes in order to diffuse the silver under the surface.

The treated sheet was then cleaned with acid (solution of $HNO_3$ and $Fe(NO_3)_3$) to eliminate the excess silver remaining on the surface that has therefore not diffused during the thermal treatment.

It was then toughened in a manner known per se, i.e. it was heated to a temperature of 670° C. for 3 minutes and then subjected to a very rapid cooling to ambient temperature.

The glass sheet treated as described above was analysed using the same techniques as those cited in Example 3.

The conducted analyses showed that aluminium was incorporated partially and completely into the bulk of the glass in the form of aluminium oxide particles. The particles have a quasi-spherical shape and vary in size from 170 to 850 nm. The particles are primarily crystalline.

Figure 6:
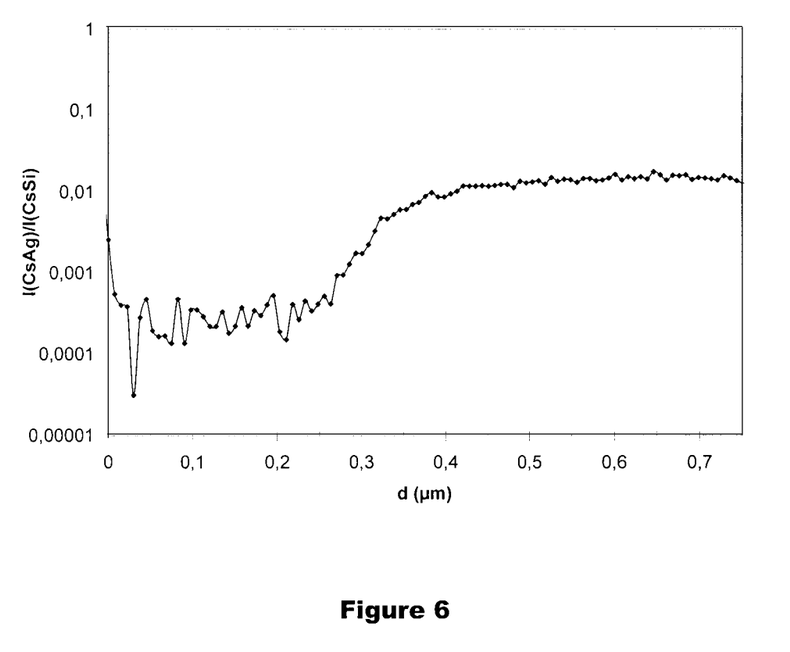
FIG. 6 shows a profile of the silver concentration in the depth of the glass of another article according to the invention obtained by flame spraying.

FIG. 6 shows the ratio of intensities I(CsAg)/I(CsSi) (logarithmic scale) as a function of the depth (d) in the glass sheet starting from the treated surface. It illustrates the diffusion of the silver under the surface of the glass. The ratio I(CsAg)/I(CsSi) at the surface (maximum value of the profile) is 0.0026, which shows that the presence of nanoparticles also enables a certain concentration of silver to be maintained at the surface even after toughening (compared to the sample of Example 1 without nanoparticle, in which the concentration of silver at the surface after a similar thermal treatment is zero).

The invention claimed is:
1. A glass article obtained from a sheet of flat glass and comprising:
   (i) at least one antimicrobial agent diffused under at least one surface of the glass in the bulk of the glass close to the surface of the glass; and

(ii) nanoparticles located under the surface of the glass at a close distance therefrom and formed from at least one inorganic compound,
wherein the concentration of the antimicrobial agent is distributed in the depth of the glass according to a profile that has a minimum, wherein the minimum is located at a distance from the surface of between 10 and 4000 nm.

2. The glass article of claim 1, wherein the antimicrobial agent is at least one selected from the group consisting of silver (Ag), copper (Cu), tin (Sn), and zinc (Zn).

3. The glass article of claim 2, wherein the antimicrobial agent is silver (Ag).

4. The glass article of claim 1, wherein the nanoparticles are at least partially crystallized.

5. The glass article of claim 4, wherein the nanoparticles are completely crystallized.

6. The glass article of claim 1, wherein the inorganic compound is at least one selected from the group consisting of an oxide, a nitride, and a carbide.

7. The glass article of claim 1, wherein the inorganic compound is a compound of magnesium, calcium, strontium, barium, scandium, yttrium, lanthanum, titanium, zirconium, vanadium, niobium, tantalum, aluminium, gallium, indium, silicon, germanium, or any combination thereof.

8. The glass article of claim 7, wherein the inorganic compound is an aluminium compound.

9. The glass article of claim 8, wherein the inorganic compound is an aluminium oxide.

10. The glass article of claim 1, wherein a dimension of the nanoparticles is from 2 to 1000 nm.

11. The glass article of claim 10, wherein the dimension of the nanoparticles is from 10 to 500 nm.

12. The glass article of claim 1, having an antimicrobial property as well as a toughened glass property.

13. The glass article of claim 1, wherein the glass article is obtained from a sheet of soda-lime flat glass.

14. The glass article of claim 1, wherein the antimicrobial agent comprises very small particles of metal or oxide, or is dissolved in a matrix of the glass.

15. The glass article of claim 3, wherein a ratio of intensities I(CsAg)/I(CsSi) measured on the surface is higher than 0.002.

16. The glass article of claim 15, wherein the ratio of intensities I(CsAg)/I(CsSi) measured on the surface is higher than or equal to 0.010.

17. The glass article of claim 1, wherein a dimension of the nanoparticles is less than 300 nm.

18. The glass of claim 1, wherein all the nanoparticles are located under the surface of the glass at a close distance therefrom.

* * * * *